United States Patent [19]

Winzer

[11] 4,285,571

[45] Aug. 25, 1981

[54] BRANCHING DEVICE

[75] Inventor: Gerhard Winzer, Munich, Fed. Rep. of Germany

[73] Assignee: Siemens Aktiengesellschaft, Berlin & Munich, Fed. Rep. of Germany

[21] Appl. No.: 68,051

[22] Filed: Aug. 20, 1979

[30] Foreign Application Priority Data

Sep. 29, 1978 [DE] Fed. Rep. of Germany ....... 2842535

[51] Int. Cl.³ ............................................. G02B 5/14
[52] U.S. Cl. .............................. 350/96.18; 350/96.16; 350/96.21
[58] Field of Search ............... 350/96.18, 96.15, 96.16, 350/96.21

[56] References Cited

U.S. PATENT DOCUMENTS

| 3,937,557 | 2/1976 | Milton | 350/96.18 |
|---|---|---|---|
| 3,937,560 | 2/1976 | Milton | 350/96.16 |
| 4,021,099 | 5/1977 | Kawasaki et al. | 350/96.18 |
| 4,165,496 | 8/1979 | Di Domenico, Jr. et al. | 350/96.15 |

OTHER PUBLICATIONS

K. Kobayashi et al., "Micro-Optics Devices for Branching, Coupling, Multiplexing & Demultiplexing" in *IOOC 1977 B11-3*.
Y. Ueno et al., "Data Highway Using Optical Fibercable" at *Conf. on Laser & Electro Optical System*, May 1976.

*Primary Examiner*—Stewart J. Levy
*Attorney, Agent, or Firm*—Hill, Van Santen, Steadman, Chiara & Simpson

[57] ABSTRACT

A branching device for optical waveguides by which a component of light is coupled out of the main light path which is formed by a first and second waveguide into a subsidiary third waveguide comprises a simplified construction which reduces material costs as well as assembly costs. For this purpose, the invention provides that between two coaxially aligned optical waveguides there is arranged only one beam divider reflector which is in the form of a coating or layer and that in the region of the group of light beams which is emitted from the end surface of one of the waveguides and is reflected by the beam divider reflector there is a gradient lens which focuses the end surface of the one waveguide onto the end surface of a third waveguide.

28 Claims, 3 Drawing Figures

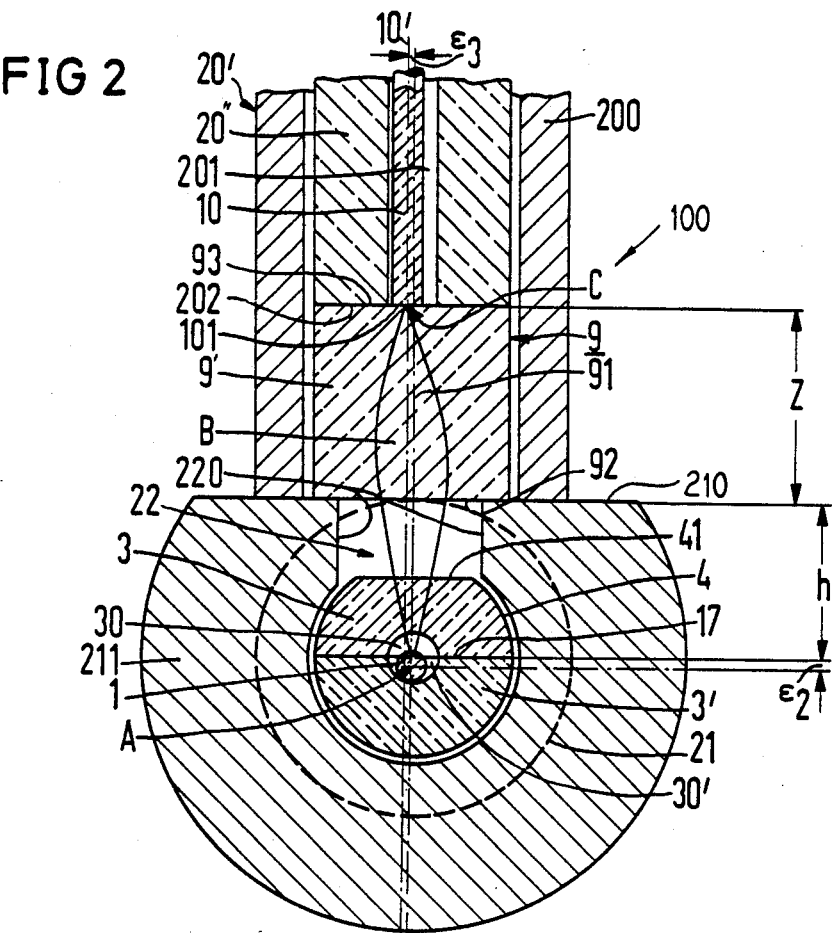
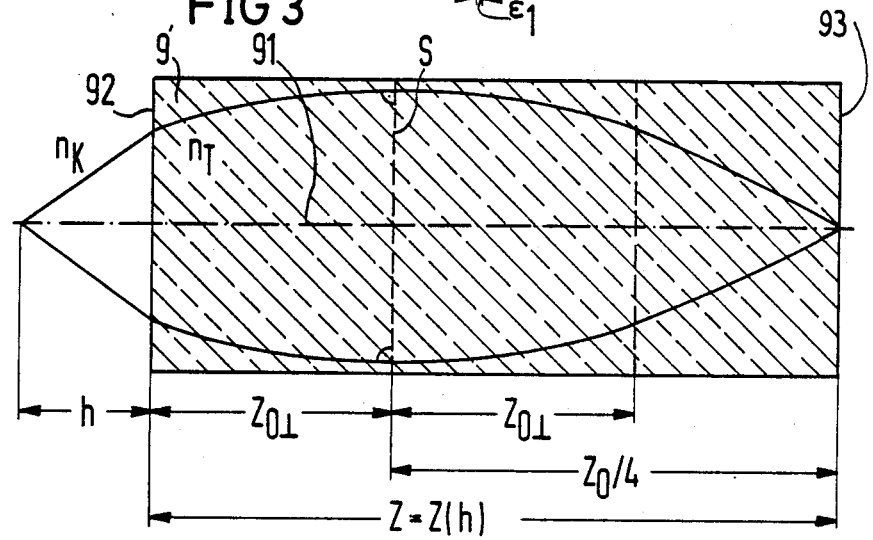

BRANCHING DEVICE

BACKGROUND OF THE INVENTION

The present invention is directed to a branching device for optical waveguides which device decouples a component of light out of a main line formed by optical waveguides into a subsidiary line which is also formed by an optical waveguide.

Branching devices or elements of the type which will branch out a component of light from the main line into a subsidiary line are disclosed by K. Kobayashi et al, "Micro-Optics Device for Branching, Coupling, Multiplexing and Demultiplexing", 1977, *International Conference of Integr., Optics and Optical Fiber Communications,* B11-3, FIG. 2. In this device, a fiber F1 abuts against an end surface of a gradient lens L1 whose other end surfaces are inclined at an angle of 45° to the optical axis of the gradient lens. A beam divider reflector is applied in the form of a coating to this inclined end surface. A second gradient lens L2 is arranged coaxial with the gradient lens L1 and, likewise, possesses an end surface which is inclined at an angle of 45° to the optical axis and which abuts against the beam divider reflector which is in the form of a coating. A second waveguide F2 abuts against the other end surface of this gradient lens L2 which, like the corresponding end surface of the gradient lens L1, is perpendicular to the optical axis. The two waveguides F1 and F2 are arranged coaxially to the common optical axis of the two gradient lenses L1 and L2. A third gradient lens L3 is arranged adjacent the beam divider reflector and is in contact with the top surface of the gradient lens L1. The third gradient lens L3 has an optical axis which is arranged at right angles to the common optical axis of the gradient lenses L1 and L2 and intersects the beam divider reflector at an angle of 45°. A third optical waveguide F3 abuts against the end surface of the gradient surface L3 which faces away from the beam divider reflector. The individual gradient lenses are dimensioned so that a group of light beams emerging from one of the optical waveguides F1, F2 or F3 are directed parallel. End beam reversal principle is used and this means that the end surface of the waveguide F1 which abuts against the gradient lens L1 is focused onto the end surface of the waveguide F2 which abuts against the gradient lens L2 and vice versa. The same applies to the gradient lens L1 and L3 in which case, however, the beam divider reflector acts as an intermediate element and is a fundamental significance.

Accordingly in the known branching devices, three gradient lenses with specific dimensions are required, although not illustrated in FIG. 2 of the above mentioned publication, the optical waveguides which are coupled to the gradient lenses are provided with halves of plug connections which are used for connecting optical waveguides to one another.

Thus, the known branching device or element is constructed from three gradient lenses which must be adjusted relative to one another during the production of the element. The following fine adjustments are also required during production:

1. adjustment of the waveguide F2 to the gradient lens L2;
2. adjustment of the waveguide F3 to the gradient lens L3. It should be pointed out that the adjustment of the waveguide F1 to the gradient lens L1 is not required as it is provided by the first two adjustments if the lens elements were already connected to one another;
3. adjustment of one plug half to waveguide F1;
4. adjustment of one plug half to the waveguide F2; and
5. adjustment of one plug half to waveguide F3.

Thus, a total of five optical fine adjustments must be carried out.

SUMMARY OF THE INVENTION

The present invention is directed to providing a branching device by means of which a component of light can be branched out of the main line formed by a pair of optical waveguides into a subsidiary line which is also formed by a waveguide. The object of the present invention is to provide a branching device which is of simpler construction and can be produced at a lower adjustment outlay.

The task of the present invention is realized with a branching device comprising first, second and third optical waveguides; means for positioning the first and second waveguides as a pair of waveguides with the axis of the first and second waveguides being on a common waveguide axis and a gap between the end surface thereof; a beam divider means being disposed in the gap and including a layer extending obliquely to the common waveguide axis for reflecting out a portion of light transmitted by one of said pair of waveguides as a light component; focusing means including a focusing lens being positioned to receive said light component and focusing the light component in real terms at a point; and means for supporting the third optical waveguide with an end surface arranged at said point.

One of the main advantages of the branching device of the present invention is that it can be constructed considerably more easily than the above described known branching devices. For example, only four optical fine adjustments need to be executed during the assembly and it can be constructed using only one gradient lens as a focusing optic. In addition, two of the plug halves required in the known branching element can be integrated to form a single component. Since the material costs are fundamentally determined by the focusing lenses and the advantageous embodiment only requires one lens, the cost of material are, therefore, particularly low. The material costs for the plug component are negligible in comparison to the assembly costs which are primarily governed by the optical adjustments. The rough estimation of the proposed branching device allows a reduction of 66% of the material costs and 20% reduction in the assembly costs in comparison to the costs of producing the above described known branching device.

The various embodiments in accordance with the present invention preferably have a layer of the beam divider being inclined at an angle of 45° to the common waveguide axis so that a beam of light traveling in the one waveguide is reflected at an angle of 90° to the common waveguide axis. The focusing lens has its optical axis extending parallel to the reflected light beam which is created by the light beam traveling in said one waveguide along the common waveguide axis and preferably coinciding with the light beam. The focusing lens is preferably a gradient lens which is arranged and dimensioned in such a manner that the real image of the surface of the one waveguide of the pair of waveguides is focused on the light outlet surface of the gradient lens which is said point and the end surface of the third waveguide contacts this outlet surface.

In constructing the device, the means for positioning the first and second waveguides includes a carrier supporting the waveguide which preferably is a pair of cylindrical carrier members received and supported in a support member. The third optical waveguide is connected to the support member of this carrier and the focusing lens is preferably mounted on the support member. Each of the carrier members receives one of said pair of waveguides with the axis of the waveguide being parallel to the axis of the carrier member and each of the carrier members consist of a transparent material at least at the end adjacent to the end surface of the waveguide. The cylindrical carrier members may have the beam divider extending over the cross section of the end surface of the one carrier member and the other end carrier member is arranged with its end surface abutting the layer of the reflector so that the reflector is sandwiched therebetween and separates the two end surfaces.

The cylindrical carrier member may consist of a glass capillary tube or may be formed by a silicon body and cover member. The silicon body has a cylindrical surface interrupted by a flat surface extending parallel to its axis which flat surface has been provided with a guide groove preferably formed by isotropic etching. The waveguide is received in the guide groove and the transparent cover member is secured to the surface to cover the waveguide in the groove and to complete the cylindrical surface of the carrier member. Preferably, the cylindrical member carrying at least the one waveguide has a portion of the cylindrical surface adjacent the layer of the reflecting means removed and replaced by a flat surface so that the light component reflected by the layer passes through a flat surface portion of the member.

The support member is preferably a sleeve member, which may consist of metal, and has an aperture at a position to enable the reflected light component to pass from the sleeve member. The outer surface of the sleeve member has a flat portion surrounding the opening and preferably to provide sufficient area for the flat surface, the sleeve member is provided with a thickened wall portion at the area of the opening to increase the wall thickness of the sleeve member. The focusing lens may be mounted at the opening on this flat surface and means for supporting the third waveguide are attached to the flat surface. The means for supporting the third waveguide includes a further support member which comprises a cylindrical body having a bore receiving the optical waveguide and may be, for example, a glass capillary tube. The means for supporting also includes an outer sleeve, which telescopically receives the cylindrical body and may be a metal sleeve. The outer sleeve may support means forming a portion of the plug connection which may be a guide sleeve which is axially secured thereon and is axially adjusted to the axis of the third optical waveguide.

BRIEF DESCRIPTION OF THE DRAWINGS

FIG. 2 is a cross-sectional view taken along lines I—I of FIG. 1; and

FIG. 3 is a side view of a cylindrical gradient lens provided to illustrate the specific relationships of its dimensions.

DESCRIPTION OF THE PREFERRED EMBODIMENTS

Figure 1:
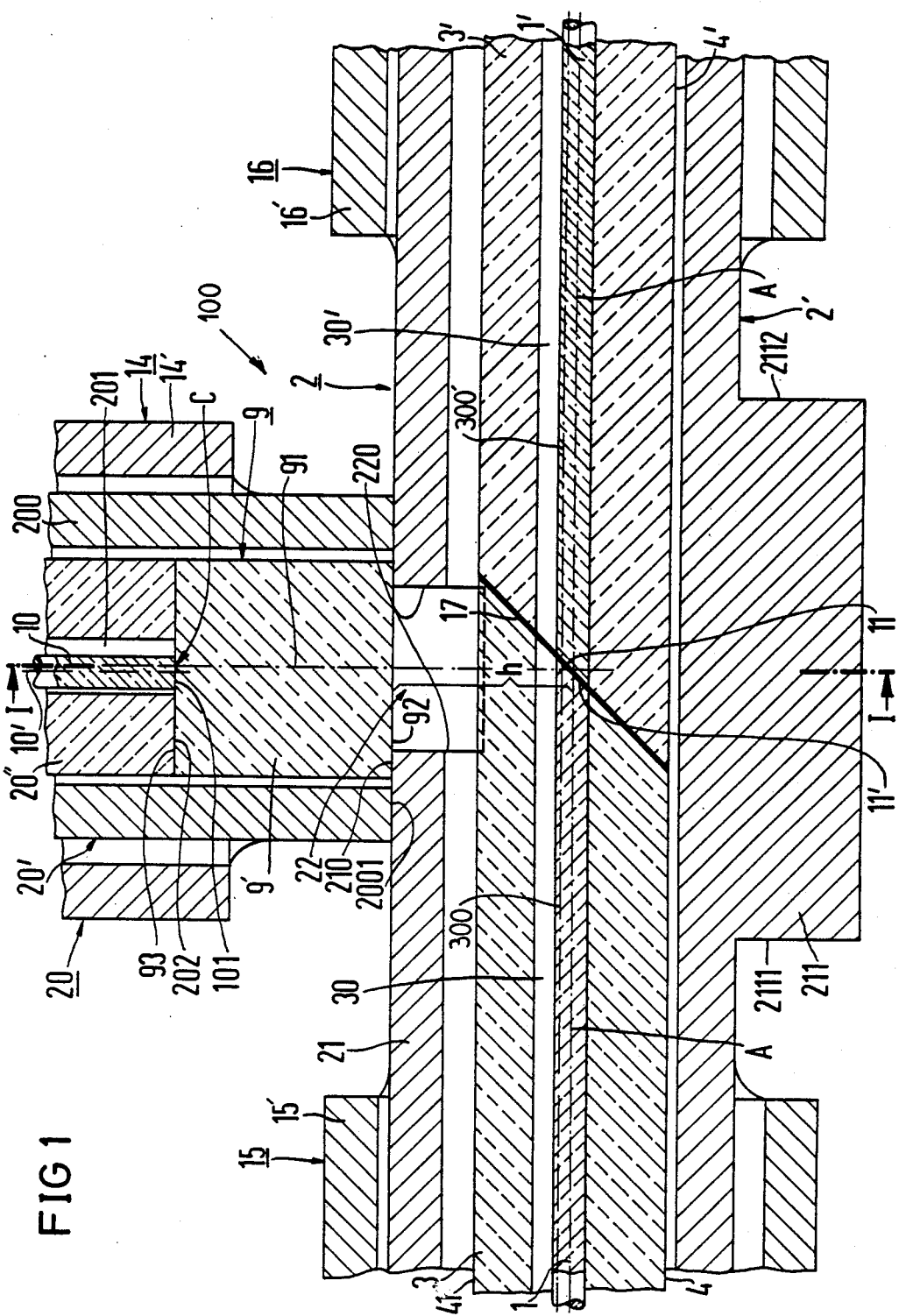
FIG. 1 is a cross-sectional view of a branching device in accordance with the present invention.

The principles of the present invention are particularly useful in a branching device generally indicated at 100 in FIGS. 1 and 2.

As best illustrated in FIGS. 1 and 2, the branching device 100 includes a first waveguide 1, a second waveguide 1' and a third waveguide 10, and means 2 for positioning the first and second waveguides 1 and 1' with a gap between their respective end surfaces 11 and 11' as a pair of waveguides with their optical axes on a common optical axis A. The device 100 also includes beam divider means comprising a layer 17 of reflective material disposed in the gap for reflecting a component of light from one of the waveguides, for example, waveguide 1 as a light component, focusing means 9 comprising a focusing lens 9' for focusing the light component in real terms at a point C and means 20 for supporting the waveguide 10 with its end surface 101 at the point C.

As best illustrated in FIGS. 1 and 2 at the gap between the ends 11 and 11' of the coaxial optical waveguides 1 and 1', a single beam reflector 17 formed by a layer that is inclined to the optical axis A of the two optical waveguides 1 and 1' is provided. Preferably, the beam divider reflector 17 is inclined at an angle 45° to the common axis A of the two waveguides. The focusing lens 9' is arranged in the region B (FIG. 2) of the group of light beams which emerge at the end surface 11 of the waveguide 1 and are reflected by the beam divider 17. The third optical waveguide 10 is arranged in such a manner that its end surface 101 is positioned at point C to which the end surface 11 of the waveguide 1 is focused in real terms by the focusing lens 9'.

An optical axis 91 of the focusing lens 9' intersects the common waveguide axis A at right angles at a point at which the axis A penetrates the beam divider reflector 17. In other words, the optical axis 91 and axis A intersect in the plane of the layer 17 and the plane of the beam divider reflector or layer 17 is at a right angle to the plane formed by the common waveguide axis A and the optical axis 91 so that the optical axis 91 coincides with a light beam which emerges in an axial parallel fashion at the end surface 11 of the waveguide 1 and is reflected by the beam divider reflector 17.

The focusing lens 9' preferably consists of a gradient lens. As will be explained in detail hereinbelow, the gradient lens is arranged and dimensioned in such a manner that the real image of the end surface 11 of the waveguide 1 is focused onto an end surface 93 of the gradient lens which faces away from the beam divider and forms a light outlet surface of this lens. Since, as already mentioned, the end surface 101 of the waveguide 10 must be arranged at point C toward which the end surface 11 of the waveguide 1 is focused in real terms by the focusing lens 9', the end surface 101 must always lie as close as possible to the light outlet surface 93 of the lens 9'. It is best for the end surface 101 to contact the light outlet surface 93.

In the exemplary embodiment, the two coaxially arranged waveguides 1 and 1' are secured in a carrier 2 which is the means for positioning. The focusing lens 9' is connected to the carrier 2 and the third optical waveguide 10 is connected by the means 20 for supporting to the carrier 2 as to be described hereinafter.

For each of the optical waveguides 1 and 1' the carrier 2 comprises cylindrical bodies or carrier members 3 and 3', which have cylindrical surfaces 4 and 4' and in which the waveguides 1 and 1' are secured parallel to the axis of the cylindrical surfaces. In the exemplary illustrated embodiment, two such cylindrical bodies 3 and 3' are provided but it would also be quite conceivable for the two waveguides 1 and 1' to be secured to one common cylindrical body. While both of the cylindrical carrier members 3 and 3' are illustrated as being of a transparent material, at least the cylindrical carrier member 3 must consist of transparent material adjacent the end 11 of the waveguide 1 so that the reflected group of light can penetrate therethrough.

The beam divider reflector 17 in the exemplary embodiment illustrated in FIGS. 1 and 2 extends over the cross section of the cylindrical carrier members 3 and 3'. The carrier members 3 and 3' are arranged with their end surfaces abutting against the layer forming the reflector 17 along with the end surfaces 11 and 11' of the waveguides 1 and 1'.

In the exemplary embodiment illustrated in FIGS. 1 and 2, the cylindrical carrier members 3 and 3' are composed of glass capillary tubes, which have openings or bores 30 and 30' in which the waveguides 1 and 1' are secured. However, cylindrical carrier members 3 and 3' could equally be constructed of a composite formed of a silicon body and a cover member. The silicon body is provided with a substantially cylindrical surface, which is interrupted by a flat surface that has a guide groove for receiving one of the waveguides such as 1 or 1'. The cover member which consists of transparent material and has a flat surface and a curved surface of the same radius of curvature as the cylindrical surface of the silicon body is secured to the surface to cover the waveguide that is received in the guide groove and to complete the cylindrical surface of the carrier member. Preferably, the groove is formed in the surface of the silicon body by anisotropic etching.

A structure such as described hereinabove comprising the coaxial pair of waveguides 1 and 1', which are coaxially secured in the cylindrical bodies or carrier members 3 and 3' and are separated from one another by the layer-like beam divider reflector 17 can be produced in a manner which is described in my copending U.S. patent application Ser. No. 066,695, filed Aug. 15, 1979 which application is based on German patent application No. P 28 40 602.2. As disclosed in greater detail in this copending application, a cylindrical starting member or body, which receives the optical waveguide is cut into two halves or pieces on a plane extending obliquely to the cylindrical axis of the body. The cut surfaces of the two halves are brought to optical quality and then a beam divider reflector is provided by applying a layer to one of the polished cut surfaces. Subsequently, the two cylindrical halves are mounted on the surface of an adjusting body which is provided with stop means so that they rest against the stop means and the cut surfaces lie parallel to one another. By moving the two halves together while still engaging the stop means, the two halves are brought together and joined with the waveguides being axially aligned.

The beam divider reflector can advantageously be deposited by vapor depositing a material thereon. Preferably, the vapor depositing of the material is a vapor depositing of metal or dielectric material onto one of the cut surfaces.

In the exemplary embodiment illustrated in FIGS. 1 and 2, the starting body consists of a glass capillary tube having a bore which receives the continuous waveguide. The waveguide is preferably secured in the bore by means of a transparent cement.

The proposed branching device 100 is preferably intended for multi-mode waveguides. The waveguides in question are primarily glass fibers and particularly glass fibers having either a stepped index of refraction or a gradient index profile.

In order to facilitate the passage of light from the group of beams emerging from the end surfaces 11 of the waveguide 1 through the cylindrical carrier member 3, it is expedient for the cylindrical surface 40 of the cylindrical carrier member 3 to be provided in the region B for the group of light beams with a flat surface component 41 which will be penetrated by the group of light beams. In contrast to the curve surface, a flat surface 41 does not influence the focusing properties of the focusing means 9 which simplifies its dimensioning and arrangement.

In the case of producing the structure as described hereinabove, the flat surface 41 can be easily produced as a flat surface component running parallel to the axis A of the member, which is to be cut into the two halves. The flat surface can be easily formed in the member by grinding away a suitable portion of the cylindrical structure which usually has a circular cross section and this flat surface component will then extend over the entire length of the structure. In the exemplary embodiments illustrated in FIGS. 1 and 2, the aforementioned group of beams penetrate the surface 41 fundamentally at right angles which is particularly favorable.

As illustrated in both FIGS. 1 and 2, the carrier 2 which forms the means for positioning also includes an outer sleeve 2' having a wall 21 which surrounds the two waveguides 1 and 1', the beam divider reflector 17 and the cylindrical carrier member or bodies 3 and 3'. The wall 21 of the sleeve 2' is provided with an aperture 22 defined by a lateral border surface 220 which will surround the region B of the group of light beams. Preferably, the outer sleeve 2' consists of a metal member.

This outer sleeve member 2' at its ends is provided with means 15 and 16 for forming a portion of a standardize plug connection for the optical waveguides. The means as illustrated includes guide sleeves or bearings 15' and 16' which are positioned on the outer sleeve member 2' with each of the sleeves being secured so as to be coaxially adjusted to the common waveguide axis A. Since the bearings or sleeves of the standardized plugs of this kind are generally known in FIGS. 1 and 2, the end components of these bearings have been broken away. However, since the bearing members 15' and 16' are secured to a common sleeve 2, the plug halves are integral to form one single component.

The wall 21 is provided with an outer flat surface 210, which surrounds the opening 22 and then serves as the bearing surface for the gradient lens 9' and for the outer sleeve 20' which is part of the means 20 for supporting the third waveguide 10. In order that the area of this flat outer surface 210 may be as large as possible, the wall 21 is provided with a thickened portion 211 in the area of the periphery which surrounds the opening 22. As illustrated, the thickened portion 211 extends along the sleeve member only over a central part and its end surfaces or edges 2111 and 2112 can act as stop means for the portion of the means forming the plug connection 15 and 16, respectively. The flat outer surface 210 extends along the common axis A only over the thickened portion 211 whose length measure along the axis A exceeds the diameter of the opening 22. In addition, the thickness of the thickened portion 211 is selected to be such that the length of the flat outer surface 210 measured along the sleeve periphery exceeds the diameter of the opening 22.

The gradient lens 9' is arranged above the opening or aperture 22. The lens 9' has an end surface 92, which forms a light inlet surface that rests directly on the flat outer surface 210 and is connected thereto. The light outlet surface 93 of the gradient lens 9', which is formed by the other end surface, abuts against the end surface 101 of the third waveguide 10 at point C.

The third optical waveguide 10 is secured in the means for supporting 20 which is connected to the carrier 2. This means for supporting 20 comprises an additional cylindrical body or carrier member 20", which is provided with an axially extending opening or bore 201 in which the third optical waveguide 10 is secured by optical element. In the same way as the cylindrical carrier members or bodies 3 and 3', this further cylindrical body 20" may consist of a glass capillary tube. It could also consist of a cylindrical member formed by a silicon body provided with a transparent cover member as described hereinabove.

The supporting means 20 also comprises the further outer metal sleeve 20', which has wall 200 which surrounds the third optical waveguide 10, the gradient lens 9' and the furthest cylindrical body 20". An end surface 2001 of the wall 200 of the outer metal sleeve 20' rests on the outer flat surface 210 and is connected thereto. The further outer sleeve 20' can also consist of a metal sleeve.

A free end of the outer sleeve or member 20' is provided with means 14 for forming a portion of a plug connection for connecting optical waveguides, which means for forming an optical connection is preferably a standardized plug. This means 14 includes a guide sleeve or bearing 14' which is placed on the outer sleeve 20' and is secured so as to be axially adjusted to the axis 10' of the third optical waveguide 10.

As also shown in FIGS. 1 and 2, the end surface 202 of the further cylindrical carrier member 20" abuts against the light outlet surface 93 of the gradient lens 9'. Because of the flat formation of the light outlet surface 93, the end surface 202 of the further cylindrical body 20" and the end surface 101 of the third waveguide can be commonly produced by grinding and polishing and this is an advantage. For this purpose, the third waveguide 10 is first secured in the opening or bore 201 and then the end surface 101 and 202 are then formed by being ground flat and polished.

All of the connections between the bodies which are surrounded by other bodies are established by means of an adhesive which is preferably contained in the gap between the body and the surrounding member. In the case of the guide parts or bearing sleeves 14', 15' and 16', the adhesive must be hardened while the device is arranged in an adjustment device which is a common practice in forming plugs so that the desired axial alignment for the sleeve and respective waveguide axis is obtained. At least in the case of waveguides 1 and 1' in the openings or bores 30 and 30' of the capillary tubes 3 and 3' and in the case of connection between the capillary tubes and the gradient lens 9' with the fiber 10, an optical cement should be used as the adhesive.

As will be clear from the above, the gradient lens 9' is dimensioned in such a manner that the image of the end surface 11 of waveguide 1 falls onto the light outlet surface 93. FIG. 3 gives another detailed view of the gradient lens 9' in a side view looking at right angles to its optical axis 91. The gradient lens 9' consists of a cylindrical body, preferably a circular cross section. The index of refraction of the body changes radially outwardly from the optical axis 91. Under the given conditions, the length Z of the gradient lens 9' is dependent upon the distance h, which is projected onto the optical axis 91 of the end surface 11 of the waveguide 1 from the end surface 92 of the gradient lens and is governed by the following formula:

$$Z = Z_{0\perp} + Z_0/4 = (\pi/2 + \arctan n_K/n_0 \cdot h \cdot \sqrt{A}\,)/\sqrt{A}$$

wherein $n_0$ is the index of refraction on the axis 91, $n_K$ is the index of refraction of the medium between the beam divider reflector 17 and the end surface 92, $A = 2/Z_0$. $Z_0$ is the so-called pitch length and when the gradient lens has a length of $Z = Z_0/4$, a group of beams produced at the input end on the lens end surface by a spot or point light source is transformed into a parallel group of beams on the output side end surface. This condition is imposed upon the gradient lenses L1, L2 and L3 of the known exemplary embodiment mentioned in the article hereinabove. However, in the device of the article on account of the fact that the divider reflector is inclined at 45° relative to the waveguide F3, the lenses can only inadequately fulfill this condition.

In the proposed branching device, gradient lenses of this kind are deliberately avoided. In addition, the disturbing influence of the oblique beam divider reflector is extremely small since it lies directly at the end surface 11 of the waveguide 11 so that it can only influence a group of the light beams of very small cross section and the expanded group can extend undisturbed towards the end surface 92 of the gradient lens 9'. This is partially due to the flat surface 41, which is arranged fundamentally at right angles to the expanded group of light beams, and to the relatively small difference in the indexes of refraction between the optical cement arranged between the gradient lens and the glass capillary tube 3 and the glass of this capillary tube.

In the above formula, the addition of $Z_{0\perp}$ is the distance of the end surface 92 of the gradient lens 9' from the plane which is at right angles to the optical axis 91 and which is penetrated at right angles by the light beams emanating from a point on the optical axis 91 which is spaced from the end surface 92 of the gradient lens 9' by a distance h.

The assembly of the individual parts of the branching device to form a complete component will generally involve within a given tolerance value axial displacements $\epsilon_1$ between the axis of the waveguide 1 and the axis 300 of the cylindrical body 3, $\epsilon_2$ between the axis of the waveguide 1' and the axis 300' of the cylindrical body 3' and $\epsilon_3$ between axis 10' of the waveguide 10 and the axis of the cylindrical member 20" with each displacement being at right angles to the relative axis of the waveguide. If $\epsilon_2$ is very small in comparison to the distance h, there is only a negligible increase in the spot diameter of the image of the end surface 11. In the assembly of the outer sleeve 20', which is secured to the cylindrical body 20" and the waveguide 10, the axial displacement $\epsilon_3$ can be compensated by displacement transverse to the optical axis 91 of the gradient lens 9'. An exact adjustment of the axis 10' of the waveguide 10 relative to the optical axis 91 of the gradient lens 9', i.e. $\epsilon_3=0$, is unnecessary as long as the change in the angle of entry of the waveguide 10 remains sufficiently small. This requirement is fulfilled simply by providing that the furthest cylindrical body 20" is a body of low eccentricity, whose outer diameter is equal to that of the gradient lens 9', and that the gradient lens together with the cylindrical body 20" which is designed in this way, are mounted in the outer sleeve 20', the opening of which is only slightly greater than the diameter of the cylindrical body 20" and the gradient lens 9'.

Finally, it should be noted that the proposed branching device can be advantageously used not only for weak output coupling but in particular also for strong output coupling.

Although various minor modifications may be suggested by those versed in the art, it should be understood that I wish to embody within the scope of the patent granted hereon, all such modifications as reasonably and properly come within the scope of my contribution to the art.

I claim:

1. A branching device for branching a light component out of an optical waveguide, said device comprising first, second and third optical waveguides; means for positioning the first and second optical waveguides as a pair of waveguides with the axis of the first and second waveguides being on a common waveguide axis and a gap between the end surfaces thereof; a beam divider means being disposed in the gap and including a layer extending obliquely to the common waveguide axis for reflecting out a portion of the light transmitted by one of said pair of waveguides as a light component; focusing means including a focusing lens being positioned to receive said light component and focusing the light component in real terms at a point; and means for supporting the third optical waveguide with an end surface arranged at said point, said means for positioning including a carrier for supporting said first and second waveguide, said carrier including a support member and a pair of cylindrical carrier members, said support member being a sleeve member having a wall provided with an aperture at a position to enable the reflected light component to pass from the sleeve member, each of said carrier members receiving one of said waveguides with the axis of the waveguide being parallel to the axis of the carrier member, each of said carrier members consisting of a transparent material at least at the end adjacent to the end surface of the waveguide, and said sleeve member receiving said cylindrical carrier member with their axes aligned.

2. A branching device according to claim 1, wherein the layer of the beam divider means is inclined at an angle of 45° to the common waveguide axis.

3. A branching device according to claim 1, wherein the focusing lens of the focusing means has an optical axis which is parallel to a reflected light beam which is created by the beam divider means reflecting a light beam traveling in said one waveguide along the common axis.

4. A branching device according to claim 3, wherein the optical axis of the focusing lens coincides with said reflected light beam.

5. A branching device according to claim 1, wherein the focusing lens is a gradient lens.

6. A branching device according to claim 5, wherein the gradient lens is arranged and dimensioned in such a manner that the real image of the end surface of the one waveguide of the pair of waveguides is focused on a light outlet surface of the gradient lens which is said point and the support means places the end surface of the third waveguide in contact with said outlet surface.

7. A branching device according to claim 1, wherein the focusing lens is mounted on said carrier.

8. A branching device according to claim 1, wherein the third optical waveguide is firmly connected to said carrier by means for supporting.

9. A branching device according to claim 1, wherein the layer of the beam divider means extends over the cross-sectional end surface of one of said cylindrical carrier members and its waveguide support therein.

10. A branching device according to claim 9, wherein the cylindrical carrier members are arranged in the sleeve member with the other cylindrical carrier member having a surface abutting against the layer of the beam divider means disposed on the one cylindrical carrier member.

11. A branching device according to claim 1, wherein each of the cylindrical carrier members consist of a glass capillary tube with a bore receiving the waveguide.

12. A branching device according to claim 1, wherein each of the cylindrical carrier members consist of a silicon body and a cover member, said silicon body having a cylindrical surface interrupted by a flat surface with a guide groove disposed therein, said waveguide being received in the guide groove and said cover member composed of transparent material being secured to the flat surface to cover the waveguide received in the groove and complete the cylindrical surface of the cylindrical carrier member.

13. A branching device according to claim 12, wherein the groove is an anisotropic etching groove.

14. A branching device according to claim 1, wherein the carrier members have end surfaces engaging said layer, each of said carrier members having a cylindrical surface with a portion being removed and replaced with a flat surface portion adjacent the layer so that said light component reflected by said layer passes through a flat surface portion of said member.

15. A branching device according to claim 1, wherein the sleeve member consists of metal.

16. A branching device according to claim 1, wherein the sleeve member at its ends is provided with means forming half of a plug connection for linking each of the pair of optical waveguides of the device to other optical waveguides.

17. A branching device according to claim 16, wherein said half of the plug connection comprises a metallic guide sleeve being fixed by an adhesive on the sleeve member and being coaxially adjusted with the common axis of the waveguides.

18. A branching device according to claim 1, wherein the outer surface of the sleeve member has a flat portion surrounding the aperture therein.

19. A branching device according to claim 18, wherein the sleeve member adjacent the aperture has a thickened portion to increase the wall thickness, said flat surface being formed in said thickened portion surrounding said opening.

20. A branching device according to claim 1, wherein the focusing lens of the focusing means is mounted directly on said sleeve member at said aperture.

21. A branching device according to claim 20, wherein the focusing lens is a gradient lens, a light inlet surface for said gradient lens being disposed on the sleeve member and secured thereto.

22. A branching device according to claim 21, wherein the means for supporting the third waveguide includes a further support member, said further support member being connected to said sleeve member.

23. A branching device according to claim 22, wherein said further support member comprises a cylindrical body having a bore receiving the third optical waveguide.

24. A branching device according to claim 23, wherein said cylindrical body of the further support member consists of a glass capillary tube.

25. A branching device according to claim 23, wherein said means for supporting further includes an outer sleeve telescopically receiving said cylindrical body having a bore which receives the third waveguide, said outer sleeve being secured directly to the sleeve member to surround the opening in said support member.

26. A branching device according to claim 25, wherein said outer sleeve consists of metal.

27. A branching device according to claim 25, wherein the outer sleeve opposite to the end connected to the support member includes means forming a portion of a plug connection for connecting the third waveguide to another waveguide.

28. A branching device according to claim 27, wherein said means forming a portion of a plug connection includes a guide sleeve secured on the outer sleeve and said guide sleeve being axially adjusted to the axis of the third optical waveguide.

* * * * *